(12) United States Patent
Yamauchi (10) Patent No.: US 7,630,130 B2
(45) Date of Patent: Dec. 8, 2009

(54) DIRECTIONAL SCREEN AND IMAGE PROJECTION SYSTEM

(75) Inventor: Naofumi Yamauchi, c/o Seiko Instruments Inc., 8, Nakase 1-chome, Mihama-ku, Chiba-shi, Chiba (JP) 261-8507

(73) Assignee: Naofumi Yamauchi (JP)

( * ) Notice: Subject to any disclaimer, the term of this patent is extended or adjusted under 35 U.S.C. 154(b) by 527 days.

(21) Appl. No.: 11/430,585

(22) Filed: May 9, 2006

(65) Prior Publication Data

US 2006/0274411 A1    Dec. 7, 2006

(30) Foreign Application Priority Data

Jun. 1, 2005   (JP)   ............... 2005-161145
Jun. 8, 2005   (JP)   ............... 2005-168100

(51) Int. Cl.
  *G03B 21/56*   (2006.01)
(52) U.S. Cl. .............. 359/443; 359/459; 359/460; 385/116
(58) Field of Classification Search ........ 359/460, 359/459, 449; 385/116, 120
See application file for complete search history.

(56) References Cited

U.S. PATENT DOCUMENTS

| 3,704,055 | A  | * | 11/1972 | Hong ............................ 359/459 |
| 6,261,664 | B1 | * | 7/2001  | Beeson et al. ................ 359/455 |
| 6,999,232 | B2 | * | 2/2006  | Peterson et al. ............. 359/460 |
| 7,262,911 | B2 | * | 8/2007  | Niwa et al. .................... 359/459 |
| 7,270,423 | B2 | * | 9/2007  | Katase ......................... 359/449 |

* cited by examiner

*Primary Examiner*—Christopher Mahoney
(74) *Attorney, Agent, or Firm*—Adams & Wilks (57) ABSTRACT

To provide a directional screen which can efficiently converge light from a projector on an observer and which is hardly affected by external light. That is, multiple transparent protrusion structures are formed on a base material, and a light absorbing layer communicating in the vertical direction of each of the protrusion structures is provided. The formation of a recess structure or a through-hole exerts an effect similar to that of a protrusion structure. Alternatively, fibrous protrusions each having a high light reflectance are used as the protrusion structures, and are densely formed on the base material while they are slanted in the direction of external light.

12 Claims, 6 Drawing Sheets

DIRECTIONAL SCREEN AND IMAGE PROJECTION SYSTEM

BACKGROUND OF THE INVENTION

1. Field of the Invention

The present invention relates to a directional screen that displays an optical image projected from a projector such as a liquid crystal projector and an image projection system that displays an image by using the screen.

2. Description of the Related Art

An image projection system such as a projection device that projects an optical image by using a high-intensity CRT, a liquid crystal projector, or the like to display an image has been widely used as a tool for communicating information to multiple users because the system can simply display a high-definition image on a large screen. There have been proposed ideas for the screen for a projector such as an improvement in efficiency for light utilization through the coverage of the surface of the screen with a white material or light reflective film having a high light reflectance and an improvement in visibility for multiple observers through light diffusion caused by the spreading of beads on the surface. In addition, as disclosed in, for example, JP 2002-169224 A, a screen surface is provided with a directional reflection structure such as a lenticular lens so that an image is efficiently displayed to multiple observers.

Although a conventional screen having directivity can efficiently converge the light of the projected image from the projector on an observer owing to its directivity, an influence of external light such as illumination light greatly contributes to the-brightness of the surface of the screen. Accordingly, the screen has a problem in that it is difficult to display a clear image in a bright room.

SUMMARY OF THE INVENTION

In view of the foregoing, an object of the present invention is to provide a directional screen which can efficiently converge light from a projector on an observer and which is hardly affected by external light.

The directional screen of the present invention reflects or transmits light from a specific direction to guide the light to an observation side, and the screen absorbs light from a direction except the specific direction. That is, the screen includes multiple transparent portions and a light absorber provided around the thickness direction of each of the transparent portions, whereby the screen guides light from a specific direction to an observation side, and absorbs light from a direction except the specific direction. Here, the transparent portions are provided in a base material, and the light absorber is provided to the inner side surface of each of the transparent portions.

Furthermore, the base material is formed of a light absorbing material, and the transparent portions are formed in the base material. Alternatively, the base material is formed of a transparent material, and the transparent portions are formed in the base material.

A recess structure or a through-hole can be used as each of the transparent portions, and the light absorber is provided to the inner side surface in a vertical direction of the recess structure or of the through-hole. Alternatively, transparent protrusion structures are formed as the transparent portions on the base material, and the light absorber is provided to the side surface of each of the protrusion structures. Each of the protrusion structures may be of a columnar shape, or may be a linear rectangular body.

In addition, a second light absorbing layer is provided to a region where no transparent portion is formed on the surface of the base material. In addition, a light reflective layer is provided to the back surface side of the base material. When a recess structure is formed as a transparent portion on the base material, a light reflective structure may be provided to the bottom surface of the recess structure.

Alternatively, a cloth obtained by knitting a warp and a weft is used as the base material of the present invention so that light from a specific direction is reflected or transmitted to be guided to an observation side, and light from a direction except the specific direction is absorbed. A light guiding short fiber is incorporated into the cloth in such a manner that an end face of the light guiding short fiber stands in a direction substantially perpendicular to the surface of the cloth.

The light guiding short fiber includes a central portion and an outer peripheral portion having a reflectance higher than that of the central portion. In addition, the light guiding short fiber is coated with a light absorbing layer. A light absorbing region may be provided to the inside of the light guiding short fiber along the lengthwise direction of the light guiding short fiber.

In addition, the image projection system of the present invention includes a directional screen having any one of the above constitutions and an optical image projector for projecting an optical image onto the directional screen.

Alternatively, the screen of the present invention has multiple fibrous protrusions each having light reflectivity formed on the base material, the multiple fibrous protrusions being slanted in the direction of external light. As a result, the screen functions to reflect or transmit light from a specific direction and to absorb light from a direction except the specific direction. To be specific, fibrous protrusions each having a high light reflectance are densely formed on the base material while the protrusions are slanted in the direction of external light. With such constitution, light from a projector is reflected on the surface of each fibrous protrusion. In addition, external light such as illumination light enters a gap between two adjacent fibrous protrusions, and is repeatedly reflected on the side surfaces of the fibrous protrusions to be absorbed. Accordingly, the screen is hardly affected by the external light, and can display a clear image even in a bright room.

In addition, a light absorbing layer is formed on the surface of the base material of the screen. The formation reduces an influence of external light incident on the side surface of each fibrous protrusion on the screen because the external light is guided to and absorbed by the surface of the base material.

Furthermore, the base material is a black cloth obtained by knitting fibers each impregnated with a black pigment or dye. After white fibers have been implanted on the black cloth, the white fibers are aligned with a predetermined direction to form the fibrous protrusions. As a result, the screen of the present invention can be produced at a reduced cost, and is so flexible that it can be wound or folded.

In addition, the screen is formed by obliquely embedding and fixing the fibrous protrusions composed of the white fibers in a light absorbable resin base material. Then, the screen is molded in such a manner that the slanting direction of each of the fibrous protrusions substantially coincides with the direction of external light. With such constitution, a gain can be easily adjusted by adjusting, for example, the length of a portion of each of the fibrous protrusions exposed from the resin base material, the filling density of the fibrous protrusions, and the thickness of each of the fibrous protrusions. In addition, a bright screen resistant to external light can be realized because the external light is absorbed by the base material.

In addition, fibrous protrusion trains each constituted by bonding one end of any one of multiple fibrous protrusions to one end of another protrusion, each of the trains being composed of protruded portions and joint portions and having a V-shaped section, are densely joined onto the base material with the longitudinal directions of the joint portions aligned with each other in such a manner that the direction of each of the fibrous protrusions is the direction of external light. In addition, the fibrous protrusions are flat fibrous protrusions. The use of a fibrous protrusion train facilitates the production of a screen. In addition, the use of a flat fibrous protrusion can increase a light reflection area. Accordingly, a screen gain can be increased, and a string structure can be easily formed on a plane base material.

Furthermore, the rear surfaces of the flat fibrous protrusions constituting the fibrous protrusion trains and the surfaces of the joint portions each have a light absorbing structure. With such constitution, a bright screen hardly affected by external light can be realized because light from a projector is reflected on the surface of each of the fibrous protrusions and, at the same time, the external light is efficiently absorbed by the light absorbing structure.

DETAILED DESCRIPTION OF THE PREFERRED EMBODIMENTS

A screen of the present invention is a screen that reflects or transmits light from a specific direction, and absorbs light from a direction except the specific direction. To be specific, multiple transparent protrusion structures, recess structures, or through-holes are formed on a base material, and a light absorbing structure communicating in the vertical direction of each of the protrusion structures, the recess structures, or the through-holes is provided. With such constitution, the screen is hardly affected by external light such as illumination light, and can display a clear image even in a bright room because light from a projector can be reflected or transmitted, and the external light can be absorbed.

In addition, adjusting the external diameter and height of each of the protrusion structures, the recess structures, or the through-holes enables the adjustment of the directivity of reflected light or transmitted light, so the light from the projector can be efficiently reflected or transmitted to the side of an observer.

In the screen of the present invention, a second light absorbing layer is provided to one surface of the base material except a portion where the protrusion structures, the recess structures, or the through-holes are formed. With such constitution, only light from a specific direction incident on each of the protrusion structures, the recess structures, or the through-holes is reflected or absorbed, and light incident on any portion except such structures is completely absorbed. Accordingly, an influence of external light on the screen is reduced. At this time, the intensity of the reflected light or transmitted light of the light from the projector can be easily adjusted by adjusting the density at which the protrusion structures, the recess structures, or the through-holes are formed.

When the screen of the present invention to be used is of a reflection type, a light reflective layer is provided to a surface opposite to the surface of the base material on which the protrusion structures or the recess structures are formed. Alternatively, a light reflective structure is provided to the bottom surface of each of the recess structures provided to the base material. Furthermore, a second base material having a light reflective layer formed thereon is arranged on one side of a substrate provided with through-holes.

When a light absorbing layer is formed simultaneously with the formation of a light reflective layer on the screen of the present invention as described above, the light absorbing layer is formed in a region where the protrusion structures, the recess structures, or the through-holes are not formed. Such constitution significantly improves a gain when the screen of the present invention to be used is of a reflection type. Furthermore, the screen is provided with the light absorbing layer, whereby the screen is not affected by external light, and can obtain a clear image even when the image is projected under illumination.

In addition, a cloth obtained by knitting a warp and a weft is used as the base material, and a light guiding short fiber is incorporated as a protrusion structure into the cloth in such a manner that both of its end faces stand in a direction substantially perpendicular to the surface of the cloth. In addition, the light guiding short fiber is coated with a light absorbing layer, or a light absorbing region is provided to the inside of the light guiding short fiber along the lengthwise direction of the light guiding short fiber. The light guiding short fiber is formed of a material in which the reflectance of a central portion along the lengthwise direction of the fiber is larger than that of a skin portion. With such constitution, light incident from an end face of the light guiding short fiber can be emitted from the other end face in a predetermined angle range, and light incident on the side surface of the light guiding short fiber can be absorbed. Therefore, a clear image can be projected even in a bright room because the light from the projector is reflected on an end face of the light guiding short fiber in a predetermined angle range, and external light such as illumination light is absorbed.

In addition, the surface of at least one of the warp and weft of the cloth to be used as the base material is coated with a reflective material such as silver or a white pigment, or a silver thread, a white thread, or the like is used in at least one of the warp and the weft. As a result, even light reflected from the surface of the base material can be used for projecting a projector image.

Furthermore, even transmitted light from a gap between cloth fibers can be efficiently used by providing a white or silver reflecting plate to the back surface of the cloth. As a result, a screen with improved brightness can be obtained.

Figure 13:
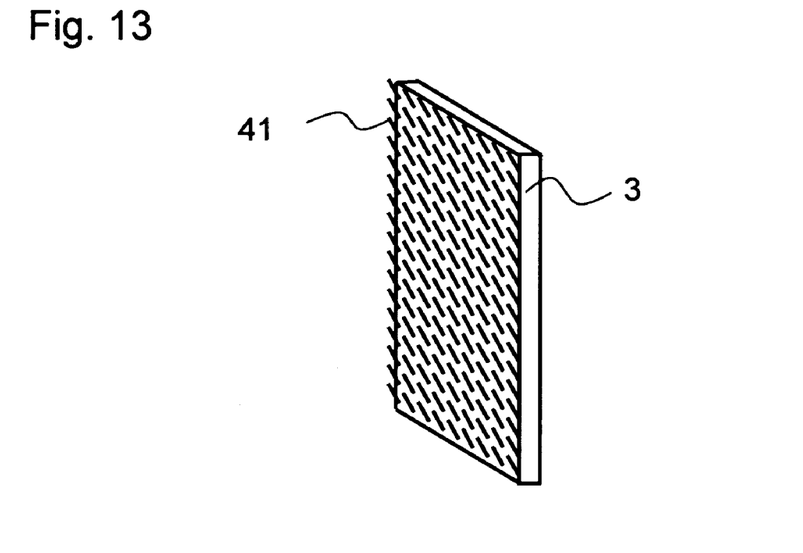
FIG. 13 is a perspective drawing schematically showing the screen of the present invention.

FIG. 13 schematically shows the basic constitution of a screen provided with fibrous protrusions. As shown in the figure, fibrous protrusions 41 are slantingly provided onto a base material 3. The fibrous protrusions have only to be essentially slanted, and are not necessarily aligned with each other. In addition, the fibrous protrusions 41 are slanted in the direction in which external light is incident. For example, when lighting equipment is placed on a ceiling, the protrusions are slanted in the upward direction of the screen. Any material such as a polymer film, a plate material, a cloth, or a metal plate can be used as the base material 3 as long as the material is plane. In addition, the base material 3 has a light absorbable surface, and the fibrous protrusions 41 each have a light reflective surface which is white or transparent, or has, for example, a metallic color.

With such constitution, an image projected from a projector (not shown) is reflected on the side surface of each of the fibrous protrusions 41. Meanwhile, external light incident from, for example, lighting equipment on a ceiling passes through a gap between two adjacent fibrous protrusions 41 to be absorbed by the surface of the base material 3. Even when the surface of the base material 3 is white, the external light is absorbed by being repeatedly reflected on the side surfaces of the fibrous protrusions 41.

In many cases, the surface of each of the fibrous protrusions 41 has an irregular, uneven shape, so the microscopic surfaces of the fibrous protrusions are directed toward various directions. As a result, the image from the projector is scattered before it enters an observer's eye. Even when the fibrous protrusions are constituted by smooth, flat surfaces, the fibrous protrusions similarly show scattering properties because they are twisted in various directions. Therefore, the projected image from the projector can be observed from a wide viewing angle. The image becomes a clear image in which a contrast inherent in the projected image from the projector is reflected because the image is not affected by the external light. In addition, an image with an improved natural appearance can be projected as the density at which the fibrous protrusions are formed increases.

In addition, a black cloth obtained by knitting fibers each impregnated with a black pigment or dye is used as the base material, and white fibers serving as the fibrous protrusions are implanted on the black cloth while the white fibers are aligned with a predetermined directions. Alternatively, the base material is formed of a light absorbable resin base material, and white fibers obliquely embedded in the resin base material are used as the fibrous protrusions.

In addition, each of the fibrous protrusions is composed of a protruded portion and a joint portion joined onto the base material, the multiple fibrous protrusions are coupled with each other at their joint portions to constitute a fibrous protrusion train having a train structure, and multiple fibrous protrusion trains are provided in such a manner that the longitudinal directions of the joint portions of the multiple fibrous protrusions are aligned with each other. Furthermore, each of the fibrous protrusions has a flat shape, the surface of each of the fibrous protrusions on a projection side has light reflectivity, and the rear surface of each of the fibrous protrusions has light absorbing property. Furthermore, the surface of each of the joint portions has light absorbing property.

EXAMPLE 1

Figure 1:
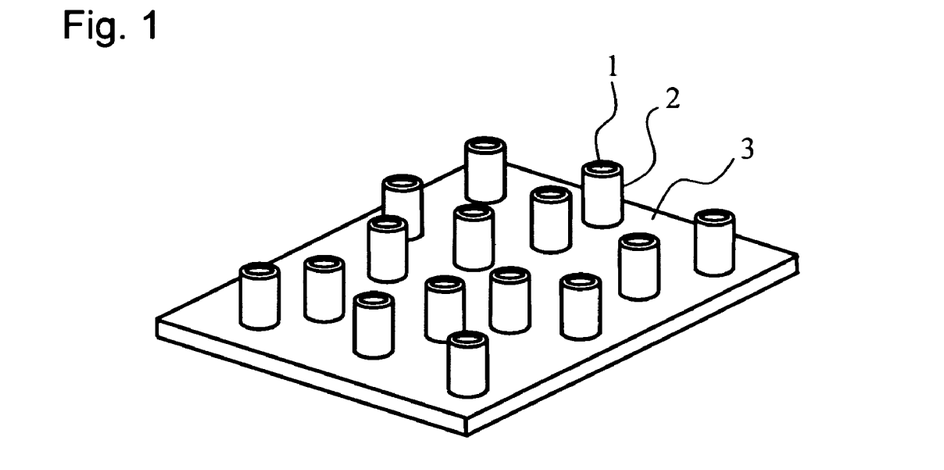
FIG. 1 is a perspective drawing schematically showing a screen according to the present invention.

FIG. 1 schematically shows a perspective drawing explaining the basic constitution of a screen of this example. As shown in the figure, the screen of this example has multiple protrusions 1 as protrusion structures formed on the base material 3. A light absorbing layer 2 is formed on the side surface of each of the protrusions 1. Here, the protrusions 1 each have a transparent columnar structure. The upper surface shape of each of the protrusions 1 is a circular shape, but a circular shape is not necessary. The upper surface shape may be an elliptical shape, a polygonal shape, or an irregular shape. In this example, a circular upper surface shape that can be most easily produced is exemplified.

Figure 2:
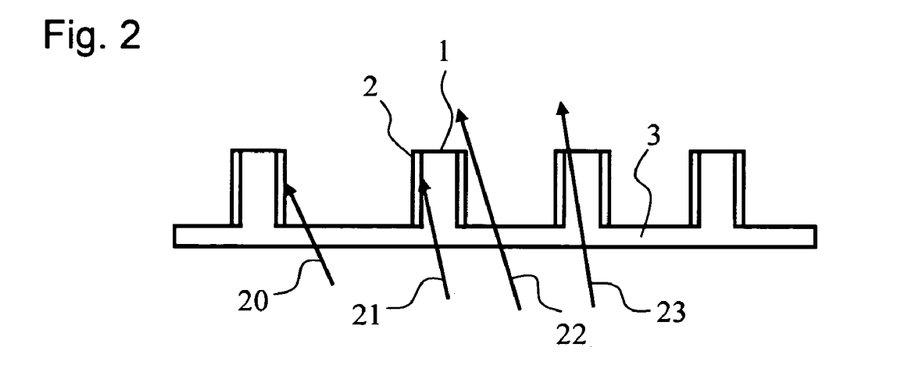
FIG. 2 is a sectional drawing schematically showing the screen according to the present invention.

The behavior of light when a transparent material is used in the base material 3 of FIG. 1 will be described with reference to FIG. 2. FIG. 2 schematically shows the sectional structure of the screen of this example. Here, the case where the screen of this example is used as a transmission screen, that is, a rear screen is shown. Projected light from a projector (not shown) is incident from the side of the base material 3. Of course, the projection light may be incident from the reverse side of the base material, but it is more preferable for the surface on which the protrusions 1 are formed to be directed toward a side which is largely affected by external light. When the projection light is incident on each protrusion 1, and does not impinge on the light absorbing layer 2 formed on the side surface of the protrusion like a light beam 23, the light transmits as it is. The projection light also transmits as it is when it is incident on a gap between two adjacent protrusions and does not impinge on the light absorbing layer 2 on the side surface of each protrusion 1 like a light beam 22. On the other hand, light which is incident on each protrusion 1 and which impinges on the light absorbing layer 2 like a light beam 21 is absorbed by the light absorbing layer 2, so it cannot transmit through the screen. Similarly, light which is incident on a gap between two adjacent protrusions 1 and which impinges on the light absorbing layer 2 like a light beam 20 cannot transmit through the screen either. As described above, the screen of this example is a directional screen which transmits light incident at a predetermined angle and which does not transmit light other than the above light. The angle of the transmitting light can be arbitrarily adjusted depending on a height up to the tip of each protrusion 1 measured from the side of the base material 3, the average diameter of the protrusions, and the density at which the protrusions are formed.

FIG. 2 shows the case where the base material 3 and the protrusions 1 are integrally formed. The protrusions 1 may be formed as separate structures on the base material 3. When the base material 3 and the protrusions 1 are integrally formed, injection molding, press molding, mold forming, or the like can be used. When the protrusions 1 are formed on the base material 3, printing or a photo process can be used for the formation.

Figure 3:
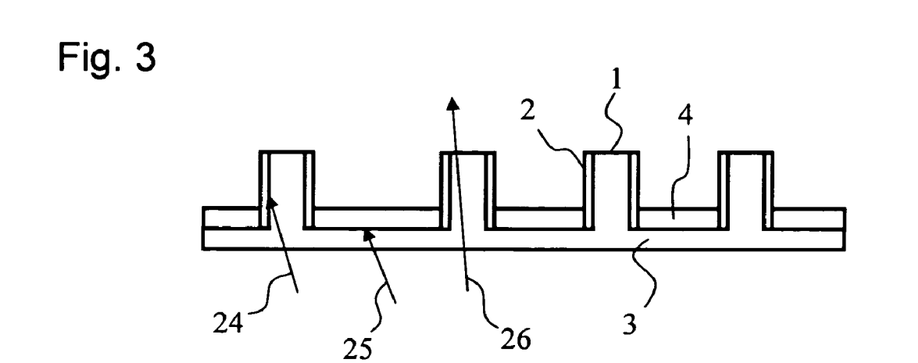
FIG. 3 is a sectional drawing schematically showing the screen according to the present invention.

FIG. 3 schematically shows a constitution in which a second light absorbing layer 4 is formed on the surface of the base material 3 on the side where the protrusions 1 are formed. The same material can be used in the second light absorbing layer 4 and the light absorbing layer 2, or different materials can be used in the layers. With such constitution, light which is incident from the rear surface of the base material 3 and which is absorbed by the light absorbing layer 2 or the second light absorbing layer 4 like a light beam 24 or a light beam 25 shown in FIG. 3 does not transmit, and only light which is incident on each protrusion 1 and which is directly emitted like a light beam 26 transmits. In this case, the transmittance of light from a projector, that is, the luminance of the screen is proportional to the opening area of each protrusion 1, so the density at which the protrusions 1 are formed on the surface is preferably made as large as possible in order to obtain a bright screen. On the other hand, most of external light except a component to be reflected on the surface of each protrusion is absorbed, so a clear image with a low black level can be projected. In order that an influence of reflection on the surface of each protrusion 1 may be reduced, the shape of the opening portion of each protrusion 1 can be a convex lens shape or a concave lens shape, or the surface roughness of the opening of each protrusion 1 can be adjusted. In FIG. 3, the second light absorbing layer 4 is formed on the surface of the base material 3 on which the protrusions 1 are formed. However, when a light opening corresponding to each protrusion 1 is formed in the rear surface of the base material 3, the second light absorbing layer 4 can be formed on the rear surface side of the base material 3.

EXAMPLE 2

Figure 4:
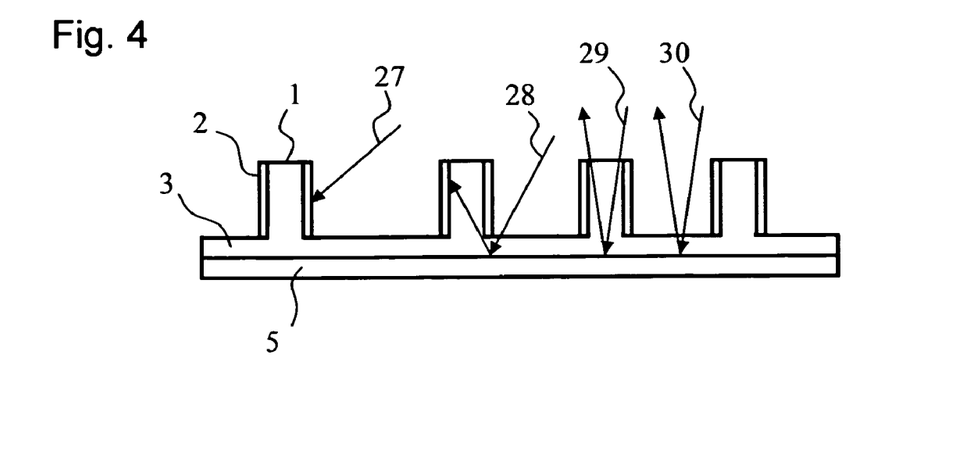
FIG. 4 is a sectional drawing schematically showing the screen according to the present invention.

FIG. 4 schematically shows the sectional structure of a screen of this example. In this example, the screen is constituted to be a reflection type screen, that is, a front screen. In this example, after the multiple protrusions 1 have been formed on the base material 3 as in the case of FIG. 2, a light reflective layer 5 is formed on the surface of the base material 3 on which the protrusions 1 are not formed, that is, the rear surface of the base material. With such constitution, projection light 29 or 30 having a certain projection angle range transmits through the inside of each protrusion 1 or of the base material 3, and is then reflected on the light reflective layer 5 to enter the field of view of an observer. On the other hand, light except projection light from a projector which has an angle of incidence larger than that of the projection light, and which is obliquely incident on the screen like, for example, a light beam 27 or 28, is not reflected by the light reflective layer 5. In such case, nearly no light reaches an observer's eye because the light is directly absorbed by the light absorbing layer 2 formed on the side surface of each protrusion 1 (the light beam 27), or is reflected once on the light reflective layer 5 and absorbed by the light absorbing layer 2 (the light beam 28). As described above, the front screen of this example can display a clear image hardly affected by external light. At this time, the projection light can be efficiently reflected by adjusting the height and diameter of each protrusion 1, and the thickness of the base material 3. For example, in order that light having an angle of incidence of ±30° or less with respect to a vertical line standing on the surface of the screen may be efficiently reflected, the average diameter of the protrusions 1 is desirably about 5.4 to 5.8 times as long as a distance from the opening surface of each protrusion 1 to the bottom surface of the base material 3. In order that light having an angle of incidence of ±45° or less with respect to the vertical line standing on the surface of the screen may be efficiently reflected, the average diameter of the protrusions 1 is desirably about 3.5 to 4 times as long as the distance from the opening surface of each protrusion 1 to the bottom surface of the base material 3.

Figure 5:
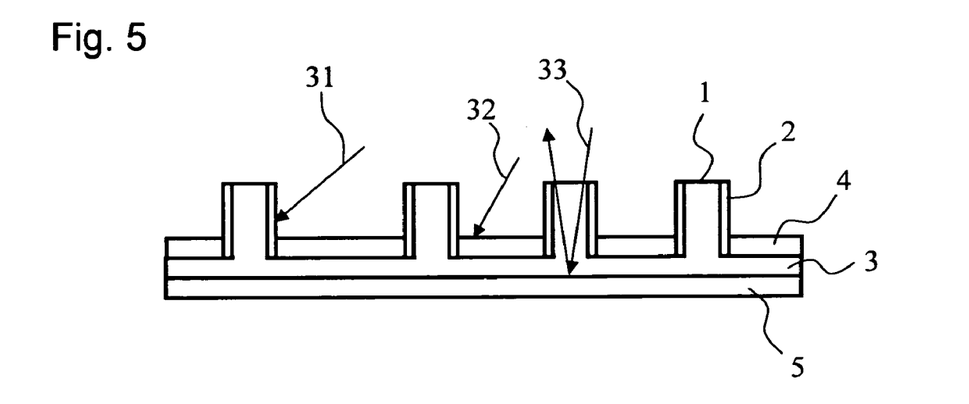
FIG. 5 is a sectional drawing schematically showing the screen according to the present invention.

FIG. 5 schematically shows a constitution in which the second light absorbing layer 4 is formed on the surface of the base material 3 on the side where the protrusions 1 are formed. With such constitution, only light which is incident on the opening surface of each protrusion 1 at a predetermined angle like a light beam 33 reaches the light reflective layer 5 to be regularly reflected, and is emitted from the opening surface of the protrusion 1 again. On the other hand, light incident on the opening surface of each protrusion 1 at an angle of incidence larger than that of the specific light impinges on the light absorbing layer 2 or the second light absorbing layer 4 to be absorbed, so it does not appear on the front surface side of the screen. That is, light incident on a site except the opening surface of each protrusion 1 like a light beam 31 or 32 is not reflected because it is necessarily absorbed by the light absorbing layer 2 or the second light absorbing layer 4. As described above, a high-definition image with a low black level can be projected on the screen of this example because only external light reflected on the opening surface of each protrusion 1 affects the projected image.

Even in this case, as in the case of the constitution of FIG. 3, the filling density of the protrusions is preferably increased in such a manner that the total opening area of the protrusions is increased to the extent possible in order to increase the gain of an image projected from a projector.

Here, the light reflective layer 5 may be formed by applying or printing a polymer binder mixed with a white pigment, or may be formed by using silver, aluminum, or a compound of each of them by means of chemical vapor deposition. Alternatively, a light reflective layer may be formed on another base material different from the base material 3, and the base material may be arranged close to the base material 3 with its surface on which the light reflective layer is formed directed toward the side of the base material 3. Furthermore, the base material 3 itself may be mixed with a white pigment or the like to have an increased reflectance before use, or a metal film or metal plate having a high reflectance may be used.

EXAMPLE 3

Figure 6:
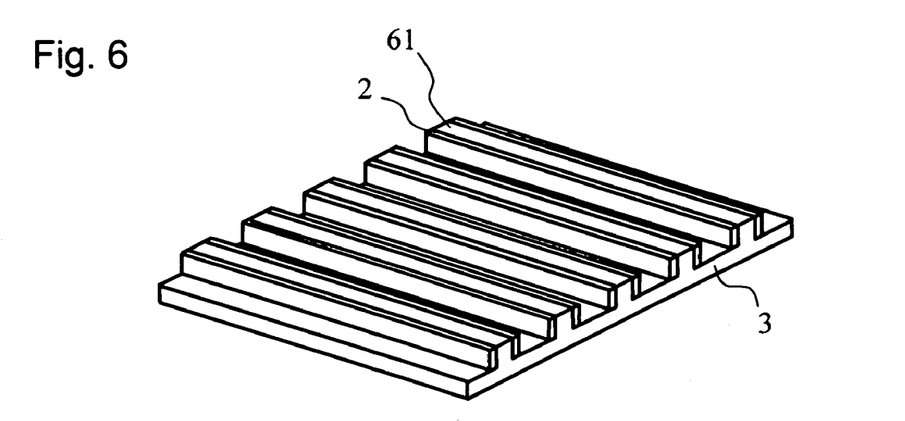
FIG. 6 is an outline drawing schematically showing the screen according to the present invention.

FIG. 6 schematically shows the external appearance of a screen of this example. In this example, linear protrusion structures 61 are formed in parallel with each other on the base material 3. In addition, the light absorbing layer 2 is formed on the side surface of each of the linear protrusion structures 61. That is, this example is different from Example 1 or Example 2 in the shape of a protrusion structure.

Light incident in parallel with each linear protrusion structure 61 except light directly incident on the light absorbing layer 2 behaves similarly to light incident on an ordinary transparent substrate, reflective substrate, or absorbable substrate, and it seems that the linear protrusion structures 61 are not formed on the surface. On the other hand, light incident even at a slight angle with respect to the direction parallel to each linear protrusion structure 61 behaves similarly to the light described with reference to FIG. 2, and the screen functions as a directional screen. As the angle of the direction in which light is incident with respect to the direction parallel to each linear protrusion structure increases, the quantity of light transmitting through the screen reduces, and the directivity of the screen increases.

When a screen having such constitution is used, an influence of external light such as illumination light can be alleviated by arranging the screen in such a manner that light from the direction in which the external light is incident is perpendicular to the lengthwise direction of each linear protrusion structure 61.

In each of the above-described examples, examples of the base material 3 and the light absorbing layer 2 include the following materials. That is, the base material 3 may be a film, may be a thick, plate-like base material, may be a fibrous base material, or may be a cloth. In addition, the base material 3 may be black, white, or transparent. In addition, a polymer resin such as a polyethylene terephthalate (PET) resin, a polycarbonate (PC) resin, a polymethyl methacrylate (PMMA) resin, a polyvinyl chloride (PVC) resin, a polystyrene resin, a polyamide resin, or a cycloolefin resin can be used as a material for the base material. Of course, an inorganic material such as glass or metal can be used as the base material. In addition, the light absorbing layer 2 can be formed through coating with: a polymer material mixed with a black pigment or a black dye; or an inorganic material having large light absorbing property such as chromium.

EXAMPLE 4

Figure 7:
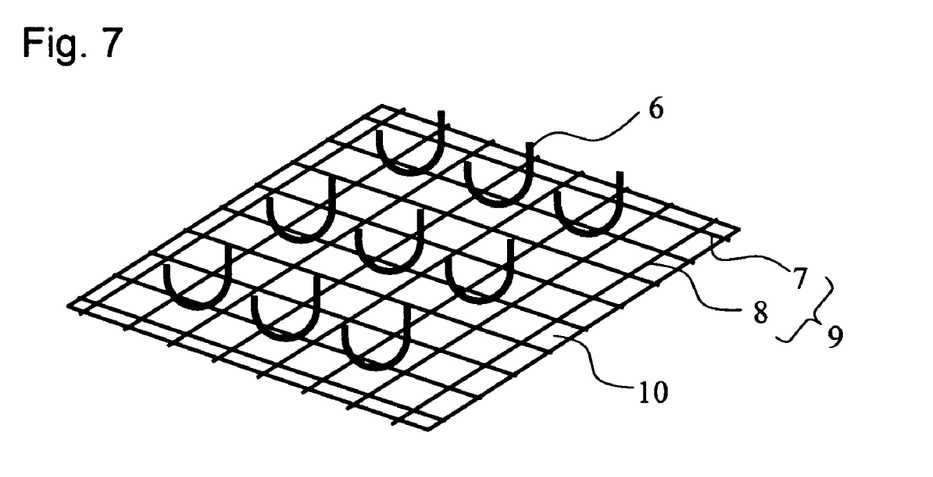
FIG. 7 is an outline drawing schematically showing the screen according to the present invention.

FIG. 7 schematically shows a constitution concerning this example. This example has the same basic concept as that of each of the above-described examples although this example has an external appearance different from that of each of the above-described examples. That is, in this example, a cloth base material 9 composed of wefts 7 and warps 8 corresponds to the base material 3 in each of the above-described examples. In addition, light guiding short fibers 6 incorporated into the cloth base material 9 in such a manner that both end faces of each of the light guiding short fibers stand in the cloth base material 9 correspond to the protrusions 1 in each of the above-described examples. In addition, a light reflective layer 10 is provided to the back surface of the cloth base material 9.

In this example, each light guiding short fiber 6 is arranged on the cloth base material 9 by being squeezed through each weft 7 once. Of course, as described later, each light guiding short fiber 6 may be squeezed through the wefts 7 multiple times. The density of the light guiding short fibers 6 can be adjusted depending on the mesh density of the warps 8 and wefts 7 of the cloth base material 9, and how many times each light guiding short fiber 6 is squeezed through the wefts 7. Of course, each light guiding short fiber 6 may be squeezed through each warp 8 instead of each weft 7. The light guiding short fibers 6 are preferably arranged at irregular positions. In reality, however, the short fibers are arranged with predetermined regularity for easy production. As described above, even when the light guiding short fibers 6 are arranged with predetermined regularity, interference such as a moire hardly occurs because both end portions of each light guiding short fiber 6 are irregularly slanted.

Figure 8:
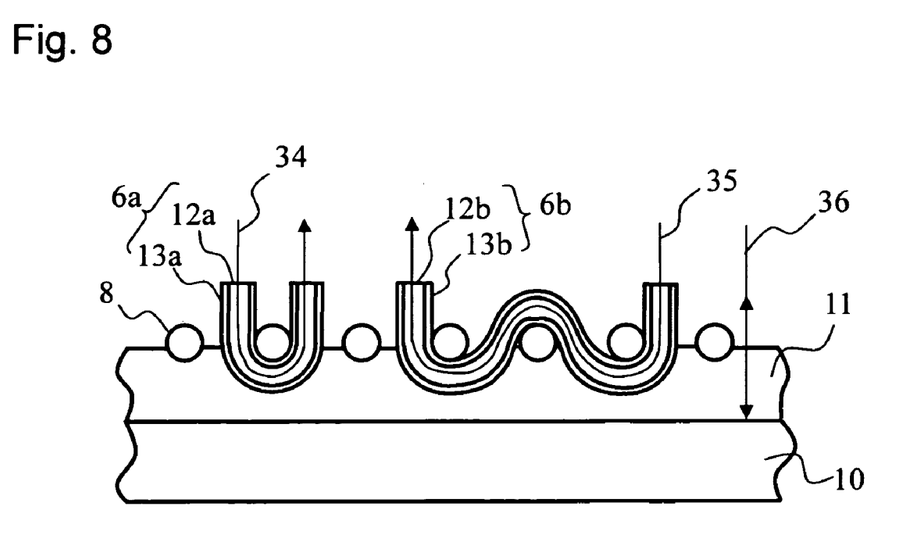
FIG. 8 is a partially enlarged sectional drawing of the screen of the present invention.

FIG. 8 schematically shows a partially enlarged section of the screen of this example for explaining an action of the screen. As shown in the figure, a light guiding short fiber 6a/6b is of a string shape obtained by coating the surface of a central portion 12a/12b with a skin portion 13a/13b. Although not expressly shown in the figure, as described later in a specific example, a light absorbing layer is formed on the surface of, or in part of the inside of, each light guiding short fiber 6. The central portion 12a/12b is formed of a material having a reflectance higher than that of the skin portion 13a/13b. Optical fibers are well-known examples of fibers each having such structure. The optical fibers are each constituted by a material having a good transmittance such as quartz glass or PMA. Those optical fibers can be used as the light guiding short fibers 6 to be used in the screen of the present invention, but with less optical loss or uniformity than that involved in an optical fiber. Therefore, for example, a structure obtained by coating the. periphery of a polyamide resin for use in each of the central portions 12a and 12b with a fluorine-based resin such as a tetrafluoroethylene-perfluorovinyl ether copolymer can be used.

For example, the light guiding short fibers 6 as described above can be easily obtained by: covering the central portion 12a or 12b with the skin portion 13a or 13b; stretching the resultant under heat in such a manner that the resultant becomes a long fiber having a predetermined fiber diameter; incorporating long fibers thus produced into the cloth base material 9; cutting the long fibers appearing on the surface side of the screen; and trimming the resultant with the lengths of the cut surfaces uniformized. This method is similar to a well-known method of producing a velvet cloth.

The left side of FIG. 8 shows an example in which each light guiding short fiber 6 is squeezed through each warp 8 once, and the right side of the figure shows an example in which each light guiding short fiber 6 is squeezed through the warps twice. The density at which the light guiding short fibers 6 are formed can be increased when each light guiding short fiber 6 is squeezed through each warp once. On the other hand, the light guiding short fibers hardly fall out of the cloth base material when each light guiding short fiber 6 is squeezed through the warps 8 twice. In addition, as shown in the figure, the cloth base material 9 into which the light guiding short fibers are incorporated and the light reflective layer 10 are stuck to each other with a joining layer 11. The joining layer 11 not only sticks the cloth base material 9 and the light reflective layer 10 but also prevents the fallout of the light guiding short fibers 6. The use of the light guiding short fibers 6 as described above, which each have an arbitrary fiber diameter and which are each soft, facilitates the production of the screen of the present invention.

In the screen of this example, light which is incident nearly vertically, which passes through a gap between two adjacent warps 8, and which is reflected on the light reflective layer 10 like a light beam 36 can be captured as it is by an observer's eye. However, most of the light beams slantingly passing through a gap between two adjacent warps 8 are reflected on the light reflective layer 10, and are then absorbed by light absorbing layers on the surfaces of the light guiding short fibers 6, so they do not reach the observer's eye. On the other hand, a light beam 34 or 35 which is incident from any one of the opening surfaces of each light guiding short fiber 6 is guided through the inside of the light guiding short fiber 6 as in the case of an ordinary optical fiber, and is emitted from the other opening surface to enter the observer's eye. As described above, both end portions of each light guiding short fiber 6 are irregularly slanted with a certain angle distribution. Accordingly, light is incident and emitted in a range in accordance with the angle distribution of both end portions of each light guiding short fiber 6. That is, the screen shown in this example also functions as a directional screen.

The reflecting property of the screen can be adjusted by changing the color of each of warps and wefts constituting the cloth base material 9 to a black color or a white color, or by using threads each having a high reflectance such as silver threads as the warps and wefts.

SPECIFIC EXAMPLE 1

Figures 9, 10, 11:
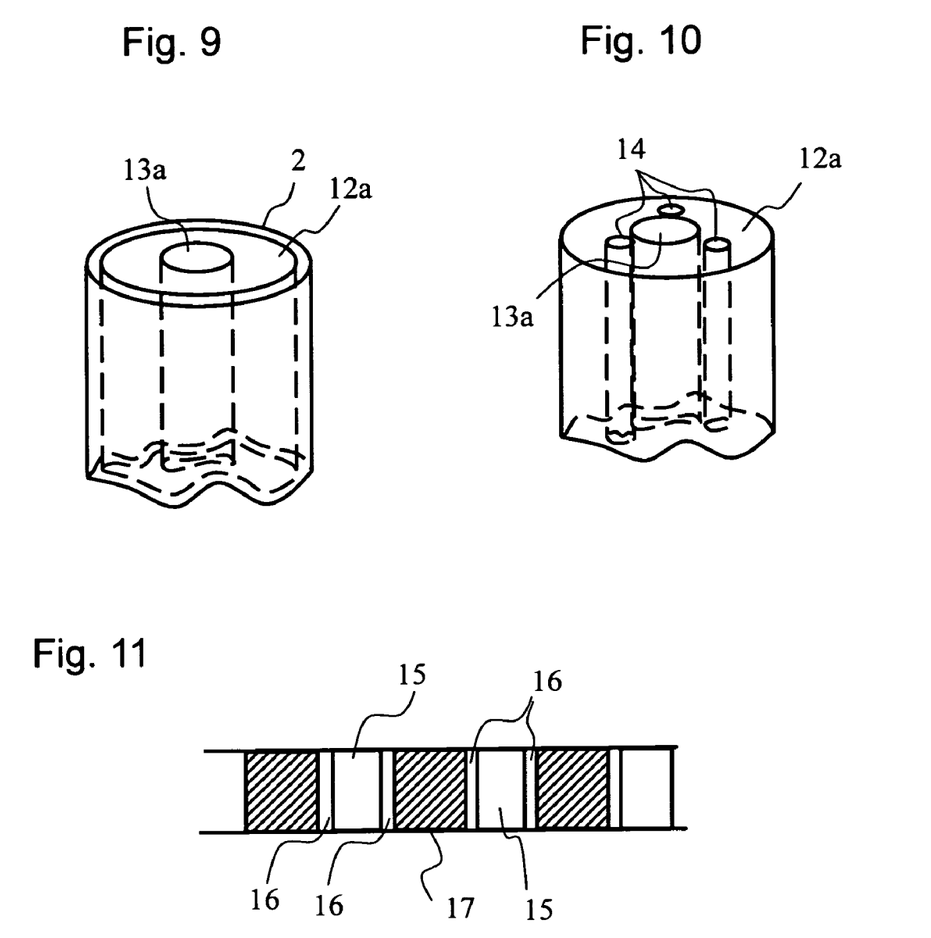
FIG. 9 is a schematic drawing showing a light guiding short fiber used in the screen of the present invention.
FIG. 10 is a schematic drawing showing the light guiding short fiber used in the screen of the present invention.
FIG. 11 is a sectional drawing schematically showing the screen according to the present invention.

FIG. 9 shows an example of the structure of each light guiding short fiber 6 used in this example. As shown in the figure, a polyamide resin is used in a central portion 13a of the light guiding short fiber, and a cellulose acetate resin is used in a skin portion 12a. The reflectance of the skin portion 12a as an outer peripheral portion is higher than that of the central portion 13a by about 0.25. The central portion has a diameter of about 30 μm, and the skin portion has a thickness of about 50 μm. The external diameter of the light guiding short fiber 6 can be freely changed from about 20 μm to 1 mm. The external diameter is preferably made as thick as possible to the extent that the resolution of an image to be projected is not impaired, and the incorporation of the short fiber into the cloth base material is not complicated.

In addition, the surface of the skin portion 12a is coated with a PET resin mixed with a carbon pigment and having a thickness of about 10 μm. The screen shown in this example using the light guiding short fibers 6 as described above shows good directional reflecting property. In addition, the screen provides a clear image even when an image is projected under illumination because the screen is hardly affected by external light.

SPECIFIC EXAMPLE 2

FIG. 10 shows another example of the structure of each light guiding short fiber 6 used in the screen of this example. As in the case of Specific Example 1, the light guiding short fiber in this specific example is constituted by the central portion 13a having a high reflectance and the skin portion 12a having a reflectance lower than that of the central portion 13a. This specific example is different from Specific Example 1 in that fibrous light absorbing portions 14 are formed in the light guiding short fiber along the lengthwise direction of the light guiding short fiber. Each of the light absorbing portions 14 is a cellulose acetate fiber containing a black dye. In the specific example shown in FIG. 10, the light absorbing portions 14 are formed in the skin portion 12a, but provided that the portions may also be formed in the central portion 13. However, the light guiding portions 14 are preferably formed in the skin portion 12a because the light guide loss of light in the light guiding short fiber increases when the light absorbing portions 14 are formed in the central portion 13a. The screen using such light guiding short fibers as shown in this specific example can eliminate an influence of external light while maintaining directivity, and can provide a clear image even in a bright room.

EXAMPLE 5

FIG. 11 schematically shows the structure of a screen of this example. As shown in the figure, through-holes 15 are formed in a base material 17, and a light absorbing layer 16 is formed on the side surface of each through-hole 15. The base material 17 may be formed of a transparent material, or may be formed of a light absorbing material. When the base material 17 is formed of a transparent material, as in the case of the example shown in FIG. 2, most of light beams transmitting through the through-holes 15 transmit through the base material 17, but a light beam incident at an angle of incidence larger that of each of the beams is absorbed by each light absorbing layer 16, so it does not transmit through the base material 17. Therefore, the screen serves as a directional rear screen which transmits light from a projector and which absorbs external light except the light from the projector, and the screen can display a clear image even in a bright room.

In addition, when the base material 17 is formed of a light absorbing material mixed with a black pigment or dye, as in the case of the example shown in FIG. 4, all light beams except light beams transmitting through the through-holes 15 are absorbed. Therefore, the screen having such constitution serves as a directional rear screen which transmits light from a projector and which absorbs external light except the light from the projector, and the screen can display a clear image even in a bright room.

When the base material 17 is sufficiently thick as compared to the diameter of each of the through-holes 15, the through-holes 15 do not necessarily penetrate through the base material 17, and may be recess structures provided onto the base material.

Figure 12:
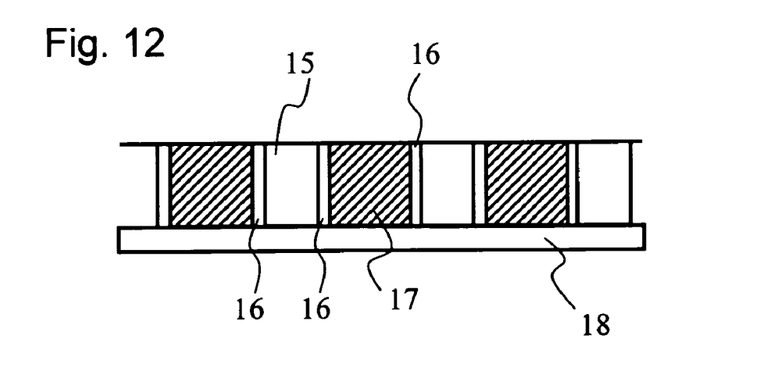
FIG. 12 is a sectional drawing schematically showing the screen according to the present invention.

FIG. 12 shows a constitution in which a light reflective layer 18 is provided to the rear surface of the base material 17. In this case as well, the base material 17 may be formed of each of a transparent material and a light absorbing material. When the base material 17 is formed of a transparent material, as in the case of the constitution shown in FIG. 4, most of light beams transmitting through the through-holes 15 of light from a projector projected from the side where the light reflective layer 18 is not formed transmit through the base material 17, but a light beam incident at an angle of incidence larger that of each of the beams is absorbed by each light absorbing layer 16, so it does not transmit through the base material 17. Therefore, the screen serves as a directional front screen which transmits light from a projector and which absorbs external light except the light from the projector, and the screen can display a clear image even in a bright room. In addition, when the base material 17 is formed of a light absorbing material mixed with a black pigment or dye, as in the case of the constitution shown in FIG. 5, all light beams except light beams transmitting through the through-holes 15 are absorbed. That is, the screen serves as a directional front screen which transmits light from a projector and which absorbs external light except the light from the projector, and the screen can display a clear image even in a bright room.

When the base-material 17 is sufficiently thick as compared to the diameter of each of the through-holes 15, the through-holes 15 do not necessarily penetrate through the base material 17, and may be recess structures provided onto the base material. In such case, a similar function can be obtained even when the light reflective layer 18 is formed only on the bottom surface of each of the recess structures.

EXAMPLE 6

Figure 14:
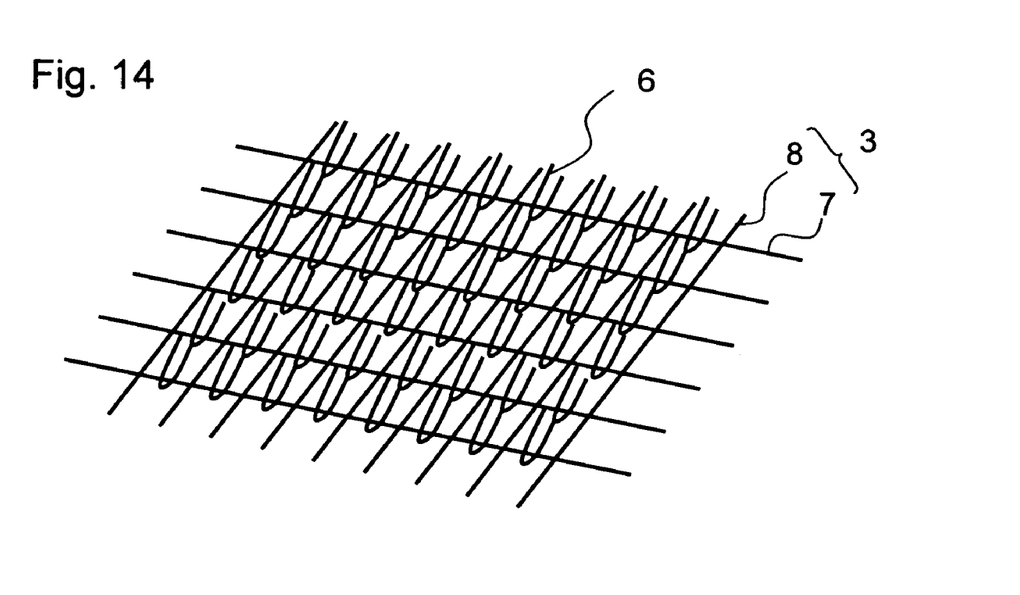
FIG. 14 is a perspective drawing schematically showing an example of the screen according to the present invention.

FIG. 14 is a perspective drawing schematically showing the structure of a screen of this example. In this example, a cloth obtained by knitting the warps 8 and the wefts 7 is used as the base material 3. Here, the fibers 6 are implanted on the wefts 7 to serve as the above-described fibrous protrusions. Here, fibers each containing a black dye or a black pigment may be used in the warps 8 and the wefts 7 constituting the base material 3. Thus, the base material 3 can have light absorbing property.

In addition, the use of fibers each containing a white pigment or transparent fibers as the fibers 6 can improve the light reflectance of each of the fibers 6 on its side surface. In addition, the use of, for example, so-called silver threads each obtained by coating the surface of each of the fibers 6 with a light reflective metal layer can improve the reflectance of each of the fibers 6 on its side surface.

A natural fiber, or a synthetic fiber which is not colored such as a polyamide resin, an acrylic resin, or a rayon can be used as a material for constituting each of the fibers 6. Although not expressly shown in FIG. 14, the strength of the screen can be increased by joining the base material 3 as a cloth onto a flat plate such as a black film with an adhesive or a tackifier.

EXAMPLE 7

Figure 15:
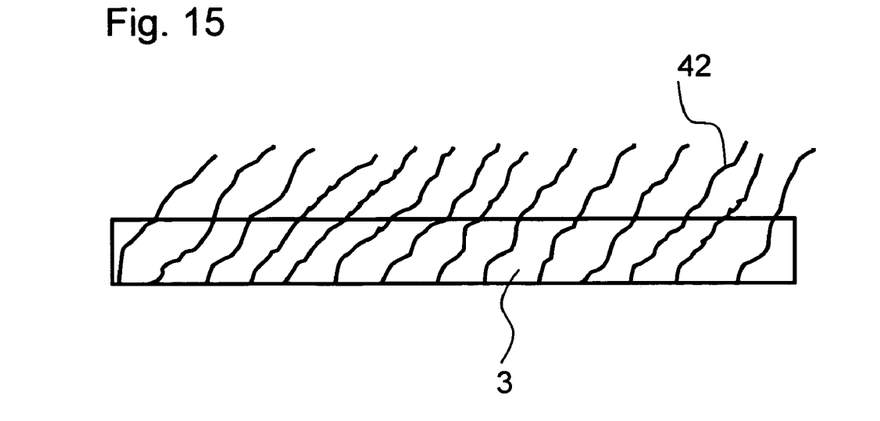
FIG. 15 is a sectional drawing schematically showing an example of the screen according to the present invention.

FIG. 15 is a sectional drawing schematically showing the structure of a screen of this example. In FIG. 15, each of fibers 42 is embedded at a predetermined angle in the base material 3. The description of the basic actions of the base material 3 and the fibers 42 shown here is omitted because the basic actions are similar to those of Example 1.

A method of producing the screen shown in FIG. 15 will be described. A thermosetting resin (such as an epoxy resin), acrylic UV curable resin, or the like containing a black pigment can be used as the base material 3. Such resin, which is in a liquid state before heat application or irradiation with ultraviolet light, solidifies through heating or irradiation with ultraviolet light. On the other hand, long, filamentous fibers are used as raw materials for the fibers 42, and they are bundled. The raw material bundle of the fibers 42 is immersed at a predetermined angle in a plane base material raw material in a liquid state. After that, the bundle of the fibers 42 can be embedded and fixed in the base material 3 through heating or the irradiation of the rear surface of the base material with ultraviolet light. After that, the bundle of the fibers 42 is primarily cut into a predetermined length, and is then secondarily cut into a target length in such a manner that the lengths of the fibers are uniformized. Through such process, the screen of this example having fibers with a uniform length can be produced.

EXAMPLE 8

Figure 16A:
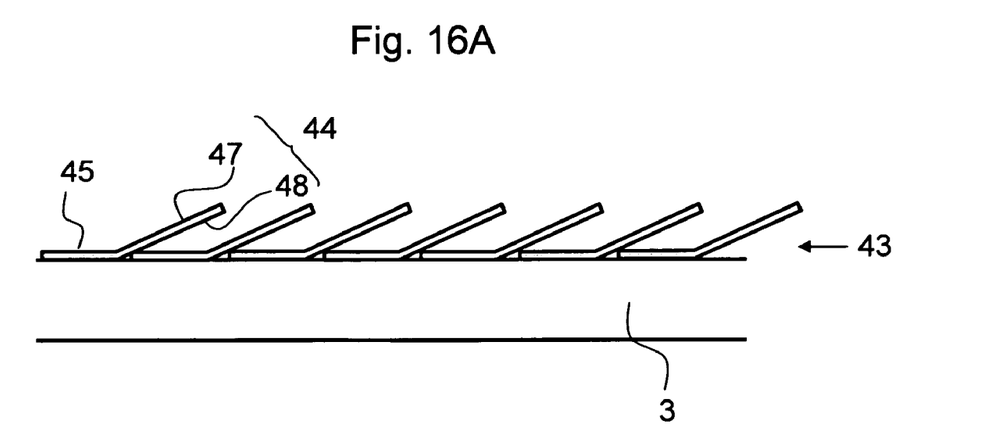
FIGS. 16A and 16B are schematic drawings each showing an example of the screen according to the present invention.
Figure 16B:
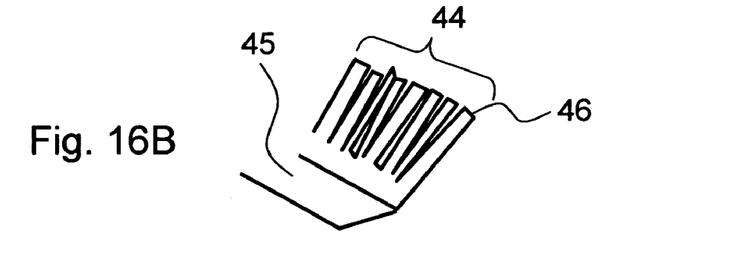

FIGS. 16A and 16B each schematically show the structure of a screen of this example. FIG. 16A is a partially enlarged sectional drawing showing the constitution of this example, and FIG. 16B is a partially enlarged perspective drawing of a fibrous protrusion of this example. As shown in FIG. 16A, in this example, a fibrous protrusion train 43 is formed on the base material 3. Each of the fibrous protrusions 44 of the fibrous protrusion train 43 is of a shape stretching long in the direction perpendicular to the paper surface of FIG. 16A. The fibrous protrusion 44 is constituted by coupling a joint portion 45 and protruded portions 46 in a "V-shape" fashion. As shown in FIG. 16B, the fibrous protrusion 44 has multiple fibrous protruded portions 46. The fibrous protrusion 44 may be formed by dividing and cutting a plane film into multiple fibrous protrusion shapes, or may be formed by embedding fibers in a resin in such a manner that the fibers are exposed at the protruded portions 46. When a plane film is cut to form fibrous protrusions, each of the fibrous protrusions is of a flat shape, the reflection area of light from a projector can be substantially increased, and a screen gain can be increased.

A surface 47 of each protruded portion 46 has a surface color with a good light reflectance such as a white color or a metallic color. A rear surface 48 of each protruded portion 46 and the surface of each joint portion 45 each have a light absorbable color such as a black color or a gray color. Thus, projection light from a projector is efficiently scattered and reflected on the surface 47 of each protruded portion 46 to enter an observer's eye. On the other hand, external light entering from the right side of each protruded portion 46 is absorbed by the surface of each joint portion 45 or the rear surface 48 of each protruded portion, so it does not enter the observer's eye. As a result, the screen of this example can be a bright screen hardly affected by the external light.

The rear surface of each joint portion 45 and the base material 3 are joined to each other with an adhesive or tackifier (not shown). When each joint portion 45 and the base material 3 are each formed of a polymer material capable of being thermally fused, they may be fused to each other by heating. A plate-like base material having rigidity, or a film-like base material having flexibility may be used as the base material 3.

As described above, with the screen of the present invention, a clear image can be projected without being affected by external light. As a result, an image can be observed even in a bright environment (for example, under illumination), a movie can be shown or a presentation can be performed in an ordinary room, and information on a large screen can be shared even in an ordinary living environment (for example, under illumination) In addition, the use of a cloth as a base material can provide a screen which is rich in flexibility and which can be easily handled.

What is claimed is:

1. A directional screen that performs one of reflection and transmission of light from a specific direction to guide the light to an observation side, and absorbs light from a direction except the specific direction, the directional screen comprising: a base material formed of a light absorbing material; multiple transparent portions formed in the base material; and a light absorber provided on an inner side surface and extending around a thickness direction of each of the transparent portions, wherein light from the specific direction is guided to the observation side and light from the direction except the specific direction is absorbed.

2. A directional screen that performs one of reflection and transmission of light from a specific direction to guide the light to an observation side, and absorbs light from a direction except the specific direction, the directional screen comprising: a base material formed of a transparent material; multiple transparent portions formed in the base material; and a light absorber provided on an inner side surface and extending around a thickness direction of each of the transparent portions, wherein light from the specific direction is guided to the observation side and light from the direction except the specific direction is absorbed.

3. A directional screen that performs one of reflection and transmission of light from a specific direction to guide the light to an observation side, and absorbs light from a direction except the specific direction, the directional screen comprising:
   a cloth obtained by knitting a warp and a weft; and
   a light guiding short fibers incorporated into the cloth in such a manner that an end face of each light guiding short fiber stands in a direction substantially perpendicular to a surface of the cloth.

4. A directional screen according to claim 3, wherein each light guiding short fiber includes a central portion and an outer peripheral portion having a reflectance higher than that of the central portion.

5. A directional screen according to claim 3, wherein each light guiding short fiber is coated with a light absorbing layer.

6. A directional screen according to claim 3, wherein a light absorbing region is provided to an inside of each light guiding short fiber along a lengthwise direction of the light guiding short fiber.

7. A directional screen that performs one of reflection and transmission of light from a specific direction to guide the light to an observation side, and absorbs light from a direction except the specific direction, the directional screen comprising: multiple fibrous protrusions each having light reflectivity and formed on a base material, the multiple fibrous protrusions being slanted in a direction of external light, in such a manner that one of the reflection and the transmission of the light from the specific direction is achieved and the light from the direction except the specific direction is absorbed.

8. A directional screen according to claim 7, wherein a surface of the base material has light absorbing property.

9. A directional screen according to claim 7, wherein each of the fibrous protrusions has a protruded portion and a joint portion joined onto the base material; the multiple fibrous protrusions are coupled with each other at their joint portions to constitute a fibrous protrusion train having a train structure; and the fibrous protrusion train comprises multiple trains provided in such a manner that longitudinal directions of the joint portions are aligned with each other.

10. A directional screen according to claim 9, wherein each of the fibrous protrusions has a flat shape; a surface of each of the fibrous protrusions on a projection side has light reflectivity; and a rear surface of each of the fibrous protrusions has light absorbing property.

11. An image projection system comprising:
a directional screen that performs one of reflection and transmission of light from a specific direction to guide the light to an observation side, and absorbs light from a direction except the specific direction, the directional screen comprising a base material formed of a light absorbing material; multiple transparent portions formed in the base material; and a light absorber provided on an inner side surface and extending around a thickness direction of each of the transparent portions, wherein light from the specific direction is guided to the observation side and light from the direction except the specific direction is absorbed; and
an optical image projector for projecting an optical image onto the directional screen.

12. An image projection system comprising:
a directional screen that performs one of reflection and transmission of light from a specific direction to guide the light to an observation side, and absorbs light from a direction except the specific direction, the directional screen comprising a base material formed of a transparent material; multiple transparent portions formed in the base material; and a light absorber provided on an inner side surface and extending around a thickness direction of each of the transparent portions, wherein light from the specific direction is guided to the observation side and light from the direction except the specific direction is absorbed; and
an optical image projector for projecting an optical image onto the directional screen.

* * * * *